(12) United States Patent
Rodgers et al.

(10) Patent No.: US 8,589,945 B2
(45) Date of Patent: Nov. 19, 2013

(54) METHOD FOR LOCATING, RESOLVING AND INVOKING SOFTWARE FUNCTIONS

(75) Inventors: Peter James Rodgers, Gloucestershire (GB); Antony Allan Butterfield, Wiltshire (GB)

(73) Assignee: 1060 Research Limited (GB)

( * ) Notice: Subject to any disclaimer, the term of this patent is extended or adjusted under 35 U.S.C. 154(b) by 1832 days.

(21) Appl. No.: 11/855,066

(22) Filed: Sep. 13, 2007

(65) Prior Publication Data

US 2008/0072235 A1   Mar. 20, 2008

Related U.S. Application Data

(60) Provisional application No. 60/845,224, filed on Sep. 14, 2006.

(51) Int. Cl.
*G06F 13/00* (2006.01)
*G06F 9/26* (2006.01)

(52) U.S. Cl.
USPC ............................ 719/313; 711/118; 711/209

(58) Field of Classification Search
None
See application file for complete search history.

(56) References Cited

U.S. PATENT DOCUMENTS

| | | | |
|---|---|---|---|
| 5,265,206 A | | 11/1993 | Shackelford et al. |
| 5,732,405 A | * | 3/1998 | Ho et al. ........................... 711/3 |
| 6,708,330 B1 | | 3/2004 | Moberg et al. |
| 7,334,107 B2 | * | 2/2008 | Schoinas et al. .............. 711/207 |
| 7,748,009 B2 | * | 6/2010 | Talluri et al. ................... 719/313 |
| 2003/0191812 A1 | * | 10/2003 | Agarwalla et al. ............. 709/217 |
| 2004/0064819 A1 | * | 4/2004 | LaVoie et al. ................. 719/310 |
| 2006/0031567 A1 | * | 2/2006 | Aoki et al. ..................... 709/235 |
| 2006/0080646 A1 | | 4/2006 | Aman |
| 2006/0248445 A1 | * | 11/2006 | Rogerson et al. .............. 715/513 |
| 2006/0259949 A1 | * | 11/2006 | Schaefer et al. ................... 726/1 |

OTHER PUBLICATIONS

"Guaranteeing hits to improve the Efficiency of a Small Instruction Cache", Hines, 2007, pp. 1-12.*
"Uniform Resource Identifier (URI): Generic Syntax", Lee, 2005, pp. 1-62.*
Fetzer C et al., "A flexible generator architecture for improving software dependability", Proceedings of the 13th International Symposium on Software Reliability Engineering IEEE Computer Society, 2002, pp. 102-113 Los Alamitos, CA, USA.

* cited by examiner

*Primary Examiner* — Tuan Dao
(74) *Attorney, Agent, or Firm* — Dale F. Regelman; Quarles & Brady LLP

(57) ABSTRACT

A method to locate, resolve, and invoke software functions, wherein the method forms a request comprising a resource identifier, resolves the request to an endpoint, evaluates the request by the endpoint to generate a resource representation.

60 Claims, 8 Drawing Sheets

METHOD FOR LOCATING, RESOLVING AND INVOKING SOFTWARE FUNCTIONS

CROSS-REFERENCE TO RELATED APPLICATIONS

This Application claims priority from a U.S. Provisional Application having Ser. No. 60/845,224 filed Sep. 14, 2006, which, including the source code Appendices "A", "B", and "C", is hereby incorporated by reference herein.

FIELD OF THE INVENTION

This invention relates to a method for invoking software functions in which the software functions and the resources to be processed by the software system are located within structured address spaces.

BACKGROUND OF THE INVENTION

In a procedural software system, such as Java or C++, a software procedure is located in memory. A thread of execution may invoke the procedure by calling the memory location. Frequently a procedure will present a typed interface defining the arguments that must be supplied to the procedure. In languages such as Java and C++ the type of the argument to be supplied is declared by the procedure and any execution invocation must supply instances of positionally correlated arguments.

For example here is a simple Java method interface:
  void javaMethod(int aValue, String bValue);
This procedure might be invoked with code similar to:
  javaMethod(100, "Hello World");

The call to execute the procedure "javaMethod" must ensure that the correct type of argument is provided in the correct positional location—in this case, the first argument must be an integer, the second must be a String object. This approach can be called 'Procedure Invocation with Positionally Correlated Typed Arguments' (PIPCTA).

Some languages, such as Python or PL/SQL, extend the PIPCTA model to support named arguments. For example, here is a Python method definition, which uses named arguments, and supplies default values:
  def                  pythonMethod(someInteger=0, someString="Default"):
The following method invocations are equivalent:

```
pythonMethod(100, "Hello World);
pythonMethod(someInteger=100, someString="Hello World")
pythonMethod(someString="Hello World", someInteger=100)
```

As those skilled in the art will appreciate, by employing named arguments the positional dependence of the arguments is removed resulting in increased code flexibility for the caller of the procedure.

Languages in which interfaces are untyped offer further relaxation of the constraint between procedure and caller. In the examples shown above, the Python language demonstrates both named arguments and untyped interfaces.

The World Wide Web (WWW) is a distributed client-server software system in which information resources are hosted on Web-servers. Web-clients and Web-servers implement support for the HyperText Transport Protocol (HTTP) and adhere to a standard means of identifying Web resources.

A Uniform Resource Identifier (URI) identifies a Web resource. A URI is an untyped location in a resource address space. Specifically, for information resources in the WWW system, the URI is a Uniform Resource Locator (URL).

The HTTP protocol defines a small set of actions that may be applied to a resource. Most commonly a client will request a copy of a resource by issuing an HTTP 'GET' request for the URL of the resource. To physically perform this action the client will parse the URL to obtain the name of the resource's host Web-server. It will then employ DNS to locate the IP address of that Web-server. Using TCP/IP networking it will then issue the HTTP GET request to the port of the host server's HTTP protocol handler. The Web-server will respond by sending a stream of bytes consisting of HTTP protocol message headers followed by a copy of the resource itself.

A Web-server must provide an HTTP transport protocol handler and a means of delivering a copy of a resource for a requested URL. Most importantly, a Web-server must be configured to perform a mapping from the logical URI web-address of a resource to the physical embodiment of the information resource.

In a simplest form a Web-server, such as Apache, might map a file system directory into the web URI address space:
  http://www.1060.org/myDirectory/=>/var/www/myDirectory/ such that a GET request for a resource below the URL path /myDirectory/ will obtain a copy of the file located in the server's directory /var/www/myDirectory/
  http://www.1060.org/myDirectory/myFile.html=>/var/www/myDirectory/myFile.html The WWW is a remarkably robust and adaptive application. It has grown to have a huge diversity of client and server implementations and its success rests on the basis of the common adherence to the HTTP protocol and URL addressing.

The Web does not have a formal architecture and yet is highly tolerant such that it accepts a wide range of styles of Web application development. Representational State Transfer (REST) is a post-hoc formal description of one such application development style. Its premise is to describe a Web application development model utilizing the HTTP protocol and URL requests with characteristics that approach an ideal. Much debate remains about what the 'ideal' is but it includes scalability (both scaling-out and scaling-up) and adaptability.

One notable point is that REST suggests that when a resource is served as the result of a computation (for example by mapping a URL to the execution of a CGI script or JSP engine), then it is good practice to explicitly embody the information necessary to compute the resource in the URL of the resource.

Suppose for example we have a map service, which dynamically generates an image of a geographical location. Its primary REST interface might have the URL:
  http://www.1060.org/cgi-bin/mapserver To generate an image it needs two pieces of information, namely the latitude and longitude of the geographical point at which to center the map (for simplicity lets assume all map images are a fixed size of 10×10 kilometers). Two possible ways of explicitly expressing in the URL the information required for the computation of the map by the mapserver can be considered. First a positional URL path approach where latitude and longitude values are expressed by position in the URL path:
  http://www.1060.org/cgi-bin/mapserver/51.536/-2.390/

An alternative approach is to use URL query parameters to provide named arguments: http://www.1060.org/cgi-bin/mapserver?latitude=51.536longitude=-2.390

The first approach is analogous to PIPCTA function invocation. The second is similar to named argument invocation. In either case the computed resource is uniquely identified by its URI. Explicitly supplying the information needed to compute the resource as part of its URI allows that a computed resource can be cached for future reuse, where the URI is used as the primary key in the cache. Transparent caching is a very important attribute for the scalability of Web applications. Applications, which adhere to the REST architectural style, are sometimes described as 'RESTful'.

Operating systems, such as Unix or Linux, locate executable application code using an environmental context. When a shell process executes it has associated with it a collection of environment variables. These variables provide the context for the execution. When the shell makes a kernel call to execute a secondary process—for example 'ls' to list a directory—the kernel uses the PATH variable containing an ordered list of directories to search the filesystem for an executable file called 'ls'. The PATH variable's listing of directories in effect represents a series of searchable resource address spaces in which executable code may be located.

When a child process is forked, by default it inherits the environmental context of its parent. It is possible to programmatically modify the environment variables within a process so as to provide a dynamic execution context but due to the limited nature of environment variables this would be a very unwieldy way to develop systems.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
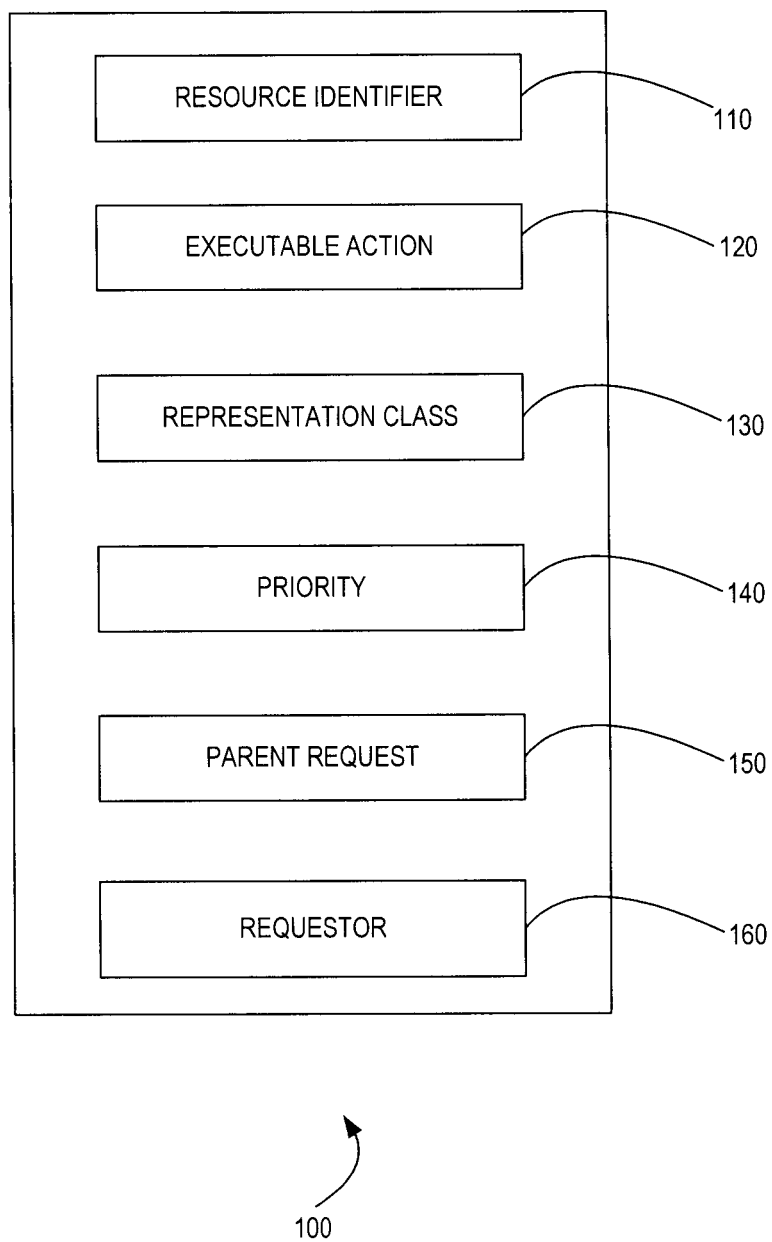
FIG. 1 is a block diagram illustrating the elements of a first request formed using Applicants' method.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' method utilizes a plurality of values, functions, function-calls, and the like, including one or more Resources, one or more Resource-Identifiers, one or more Resource Representations, one or more Endpoints, one or more Contexts, one or more Requests, one or more Requestors.

By "Resource," Applicants mean an entity to be modeled in the software system. A resource comprises an logical object and can only be physically processed when reified as a Resource Representation. Information values computed by the execution of the software system are treated as resources. Resources may also reside externally to the execution of the software system. A resource may have one or more Resource Identifiers.

By "Resource Identifier", Applicants mean a value expressing an identity for a resource. A Resource Identifier is often an address, or vector, to a location within a resource address space. Resource Identifiers are not absolute. Rather, Resource Identifiers are resolvable relative to a Context.

By "Context," Applicants mean a Resource Identifier address space. A context resolves Requests to Endpoints that reify Resource Representations. A context receives and resolves requests for resources. A context returns a resolution representation containing a reference to a resolved Endpoint, both its physical implementation and its logical identity within the address space, and a Request-Scope constructed during the resolution. In a preferred embodiment, a resolution representation is returned in an IResolution object comprising:

```
EndpointReference getPhysicalEndpoint( );
ResourceIdentifier getLogicalEndpoint( );
Request-Scope getRequestScope( );
```

By "Endpoint," Applicants mean a software function, which computes Resource Representations and/or provides a gateway for changing a resource.

By "Resource Representation," Applicants mean the concrete embodiment, or reification, of a resource. It may comprise information representing the current state of a resource or comprise information representing the state to which a resource should be 'set'. A Resource Representation can be implemented using any suitable computational information model, examples include: a handle to a file on a file system, or an in-memory object model.

A Request comprises an information structure. In addition, a Request comprises the information needed to identify, resolve and perform an action upon a Resource. For example and referring now to FIG. 1, Request 100 comprises Resource Identifier 110, Executable Action 120, Representation Class 130, Priority 140, Parent Request 150, and Requestor 160. In certain embodiments, the Executable Action 120 is selected from the group consisting of resolve, source, sink, delete, new, exists, meta, and transrept.

Resource Identifier 110 comprises an identifier for a resource. Executable Action 120 comprises a qualifier indicating the action of the request upon the resource. Representation Class 130 comprises the type or classification of representation that should be returned in response to Request 100. A scheduler algorithm to schedule execution of Request 100 uses priority 140. Parent Request 150 comprises a reference to an earlier, i.e. parent request, with which Request 100 is associated. Requestor 160 comprises the software function wherein Request 100 was constructed and issued. A Response to Request 100 is provided to the Requestor 160.

In addition to the information structure recited in FIG. 1, a request further comprises a Request-Scope. A Request-Scope defines the contexts in which the request may be resolved. In practice, a linked list of contexts, the nearest context being the first in the list. For example and referring now to FIG. 2, Request-Scope 200 comprises a first context 210, a second context 220, and a third context 230.

Context 210 comprises a first searchable address space, context 220 comprises a second searchable address space, and context 230 comprises a third searchable address space. In certain embodiments, the first searchable address space, the second search able address space, and the third searchable address space are disposed in the same computer readable medium. In other embodiments, the first searchable address space, the second search able address space, and the third searchable address space, are each disposed in a different computer readable medium.

Figure 2:
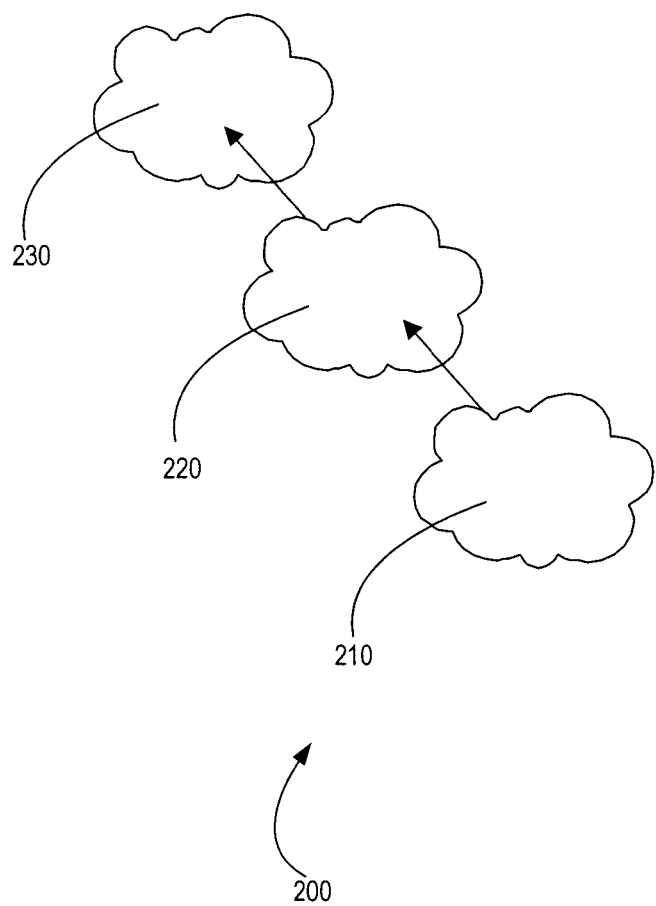
FIG. 2 is a perspective view of a linked list comprising three contexts.

FIGS. 1 and 2 illustrate a Request information structure comprising the minimum required using Applicants' method. Higher-order data can be added to a Request using additional data fields. Examples of information that could be added to an extended request include, without limitation: authentication credentials, billing and payment tokens, quality-of-service contractual obligations etc.

A Requestor comprises executable code that constructs and issues a Request for a Resource. In certain embodiments, a Requestor comprises an Endpoint residing in a Context. In other embodiments, as in the case of a transport or bootloader, a Requestor might be on the edge of the system and "injects" one or more Requests into the system, in which case it must construct or obtain an initial request context. The Requestor's Context provides the Request-scope for Requests created and issued by the Requestor. A Requestor issues such a resource request to the kernel scheduler to be resolved to a Resource Representation.

Figure 3:
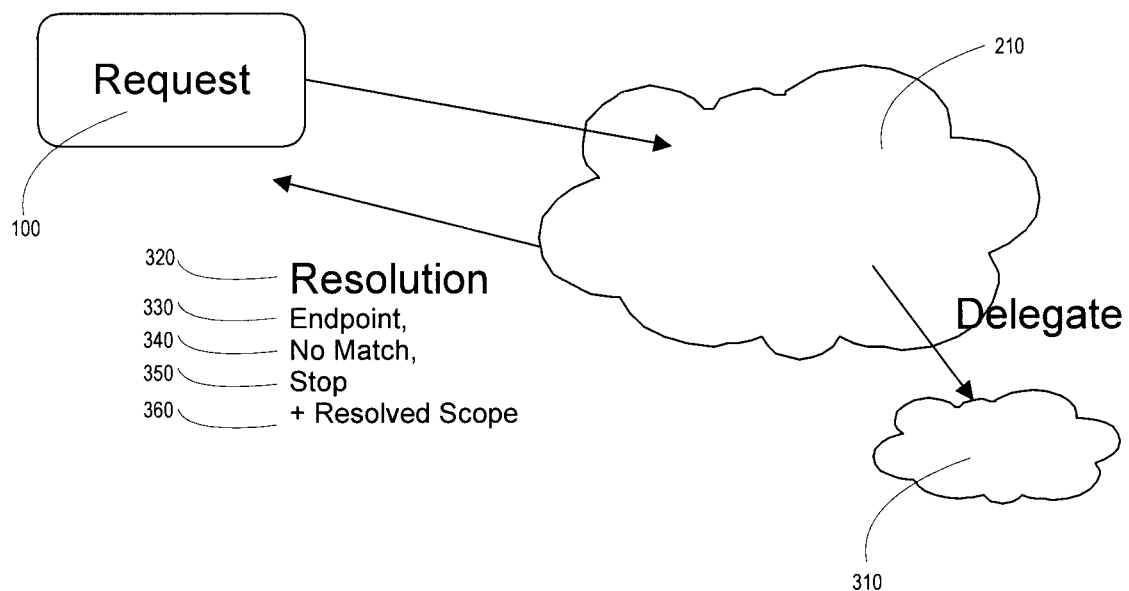
FIG. 3 graphically illustrates the resolution of the request of FIG. 1 in one of the contexts of FIG. 2.

Referring now to FIG. 3, Request Resolution 320 comprises locating an Endpoint that can satisfy a request. The kernel scheduler allocates execution threads to Requests to resolve an Endpoint for a request. The scheduled thread starts to resolve the request using the nearest context in the request-scope. It creates a RESOLVE sub-request with the request to resolve as a field and issues it to the Context. In the illustrated embodiment of FIG. 3, Context 210 interprets Request 100 and either:

1. Recognizes that it has an Endpoint 330 that can handle the request and which can deliver a Resource Representation. A successful Resolution 320 results in the return of an IResolution object to the kernel containing Endpoint reference 330 and a constructed Request Scope 360.

2. Delegates resolution to another Context by issuing a further sub-request, such as for example Context 310. Delegation enables Contexts to be nested to create modular address space compositions. The evaluation order of delegated contexts is information model specific and depends on the implementation of the Context. For example, a Context might host a composite address space resulting from the import of several contexts.

3. Fails to match the request and returns a Response 320 comprising a "No Match" indication 340 to the kernel. The response can indicate one of two states to the kernel.
   a) "Stop" 350—do not attempt to resolve any further. The Context has determined that the resource should not be resolved any further.
   b) Broaden the scope and continue the resolution process. The kernel will 'pop' the request-scope of the request and try to resolve it using the next available context. The failed context moves out of scope and will not be retried.

When a request cannot be resolved in the nearest Context, the kernel will 'pop' the Request-Scope. The next Context in the linked list of contexts is selected and the request resolution process is performed in this Context. As a result, the previous context is "popped", i.e. removed from the Request-scope. Applicants' method continues this "context-popping" process -until either an Endpoint is resolved or all Request-scopes have been popped. If the resolution process does not resolve an Endpoint the kernel will return an Application Error to the Requestor indicating a resolution failure.

In an optimization the kernel retains a cache of previously requested Contexts used in the current request resolution. The kernel checks each selected Context against the previously popped contexts and does not attempt to resolve against a Context if it has previously failed. This optimization improves resolution times in cases where a context has more than one entry in a request scope.

Finally, for some requests it can be useful to construct a Durable Context. A Durable Context is preserved by the kernel during the scope-popping process. After a resolution is completed, the kernel reattaches popped Durable Contexts as the nearest contexts in the resolved request-scope. Therefore a Durable-Context remains at the top of the Request-Scope when a Request is evaluated by the resolved Endpoint. As an example of when this can be valuable, a durable context might provide a mapping from a Resource Identifier to a physical instance of a Resource Representation. When added as the nearest context in a request, such a durable context provides the ability for a Requestor to present pass-by-value arguments to an Endpoint. In a similar way, a durable context can be used to implement the Environment Variable pattern of Unix and other operating systems.

In certain embodiments, the process of Request Resolution comprises the use of one or more Contexts. Movement through contexts during resolution adds (context delegation) or removes (scope-popping) Contexts to the Request-Scope. The Request-Scope that is constructed during resolution provides the Request-Scope for Resources that might be requested from within the Endpoint. Applicants' process of Request Resolution comprises the key to the dynamic construction of the address-space scope for locating and calling software functions.

Having resolved a Request to an Endpoint, the kernel constructs a new Request from the original Request containing copies of its data values, and the Request-Scope constructed during the resolution process. The parent of the new request remains the same as the parent of the original request. In a preferred optimization the new Request is constructed by wrapping the original Request thereby reducing information redundancy. New Request provides a mechanism to override values for modified fields such as the Request-Scope.

Figure 4:
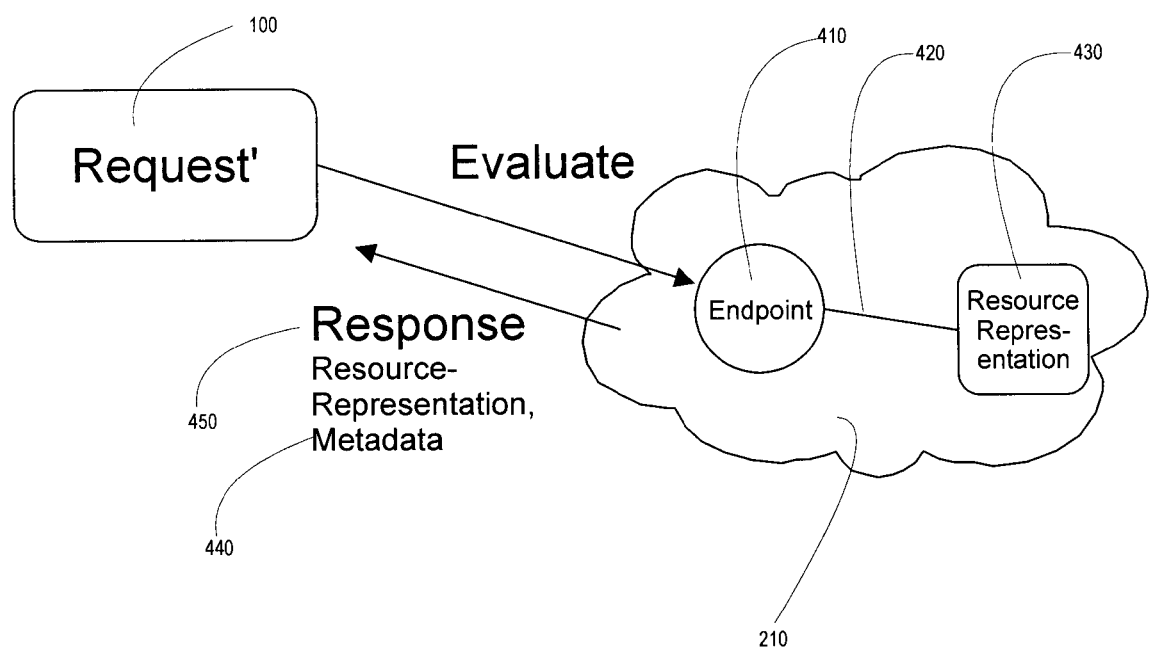
FIG. 4 graphically illustrates the evaluation of a second request formed using Applicants' method.

Referring now to FIG. 4, the kernel evaluates the New Request in the Endpoint by calling a method on the Endpoint that accepts the New Request. In an illustrative embodiment presented in the Appendix A source code incorporated by reference herein, IEndpoint interface presents a method named onRequest(Request) which is invoked to evaluate a request. The information contained in the new request is used by the Endpoint to perform its operation. In general the Endpoint will perform a computation 420 and return a Response 450. That Response 450 comprises an information structure comprising the New Request received by the Endpoint from the kernel, a Resource Representation 430 comprising an information structure comprising the information expressed by the resource or an information structure containing the outcome of the New Request, Response Metadata 440 comprising hidden system metadata and optional user specific metadata.

In certain embodiments, Metadata 440 comprises, without limitation, the expiration of response, i.e. an indication if the response is reusable, the cost of generating the response, the scope within which the resource is meaningful, dependent resources that are involved in creating the response, and the like.

Frequently an Endpoint will construct and issue further sub-requests for Resource Representations that are required in order to fulfill the New Request evaluation. In order to correlate long-running asynchronous processes an Endpoint will usually set the Parent Request of the sub-requests to be the New Request. Sub-requests will usually inherit the Request-Scope of the New Request.

After a Resource Representation has been returned by the Request Evaluation then the kernel compares the class of the Resource Representation that has been returned in the response to that which was desired by the Representation Class field of the original Request. If the desired class has not been returned then the kernel attempts to locate an Endpoint that can perform a transrepresentation of the given Resource Representation to the required class.

By "transrepresentation" Applicants mean an isomorphic lossless transformation of the resource information held in one Resource Representation to the resource information expressed in another alternate Resource Representation. Examples include parsing an XML file from binary data stream to DOM object model or compiling a script from ASCII text to machine readable bytecode. As a further example, a mismatch between meta data associated with the two classes. For example, the requested class could be XML-DOM using XML schema "A" and the returned representation could be class XMLDOM using XML schema "B". In this case, a transrepresentation could be requested to convert information encoded as XMLDOM(schema "A") to XML-DOM(schema "B").

Transrepresentation does not change the underlying information of the resource but instead it serves to restructure the resource information into a more desirable form for the Requestor. One benefit of Transrepresentation is that it provides a formal process for reducing information entropy in computational results.

If the response needs transrepresentation the kernel constructs a new Request. This Request will have a request Executable Action type of TRANSREPT. The Request Scope will be that of the original request with the addition of a new nearest Durable Context, which maps the Resource Identifier to the Resource Representation returned in the previous evaluation Response. In the same way as for the initial request, the Transrepresentation Request is resolved using the Request-Scope to locate an Endpoint that can perform the transrepresentation operation. It is Context specific how the TRANSREPT request is resolved within the Context to a transrepresentation Endpoint. If an Endpoint is resolved, the request is evaluated in the resolved Endpoint in the same way as described in the Request Evaluation section.

It will be clear to those skilled in the art, that this pattern can be continued to perform additional resource processing steps within the request scope. A kernel would replicate the pattern described for TRANSREPT post-processing with requests constructed within the request context and an appropriate Executable Action used to indicate the processing action.

Finally the Request will be satisfied and a Resource Representation will be available to be returned to the Requestor. In a preferred embodiment the kernel will use the Request information structure, especially the Resource Identifier and Request Scope, and any associated response metadata to determine a unique key for the resource. If the Resource Representation is deemed cachable the kernel will place it in a cache and return the resource representation in a response to the Requestor.

The most efficient processing is not to do any processing, and therefore, in practice the kernel performs a cache lookup before resolving any request. An implementation of the kernel scheduler, which performs caching and cache lookup, and a cache implementation, is implemented in the source code recited in the Appendices incorporated by reference herein.

For Resource Representations that cannot be usefully cached because the Resource is perpetually changing, the resolution process itself rather than the final Resource Representation can be cached. The IResolution object is cached against a key consisting of the request to be resolved's identifier and scope. This mechanism provides near constant time lookup for resolutions against previously resolved resources.

A robust software system should provide mechanisms for signaling error conditions. Errors can be categorized into two types: Application Errors—errors that are generated due to unanticipated state or bugs in implementation code in an Endpoint or a failure to resolve a request in a request-scope. Runtime Errors—errors that occur within the software system but that are not specific to a single Endpoint; examples include exhausting memory capacity, termination of thread execution, etc.

An Endpoint must catch and manage application errors. If an application error results in a failure of an Endpoint to fulfill its assigned request then the Endpoint should return a response containing an Exception Resource Representation. The kernel will return the response containing the exception representation to the Requestor. The Requestor may choose to process the exception representation or may choose to issue a further exception response to its Requestor. This error forwarding chain may propagate through the entire request call stack. It can be seen that the resource oriented nature of this invention allows that an error generated at one level of a request hierarchy may be treated as processable resource to a higher order Requestor.

An Endpoint will usually not catch runtime errors. In certain embodiments, the kernel scheduler is implemented to catch runtime errors in the Thread assignment implementation. The kernel must determine the severity of the runtime errors. Non-critical runtime errors may be wrapped as an exception representation and returned in a response to the Requestor. Critical runtime errors may cause the kernel to respond by taking emergency measures to stabilize the software system.

In certain embodiments, a kernel scheduler performs the scheduling of threads for Request Resolution and Request Evaluation. An implementation of a kernel scheduler is embodied in the source code recited in the Appendices incorporated by reference herein.

Applicants' method does not require that a Context be identified. The relationship between Contexts and Request-Scopes can be implemented entirely using software references. In certain embodiments, Applicants' method identifies a context with a Resource Identifier. In certain embodiments, a Version Identifier may additionally qualify an identifier. By identifying and versioning Contexts the composite address space constructed when a first Context delegates to a second Context allows for multiple independent and co-existing generations of software environments in the same overall software system.

In embodiments wherein Contexts are uniquely identified and versioned, Applicants' method includes the implementation of a request Request-Scope using either software references or, by use of the context identifier and version. The source code recited in Appendices incorporated by reference herein embodies a system wherein all of the context implementations are identified and versioned. For computational efficiency the request implementation employs only software references for Request-Scopes.

There is no limit to the number of resource space models and resource addressing schemes that can be developed. The following Example is presented to further illustrate to persons skilled in the art how to make and use the invention. This Example is not intended as a limitation, however, upon the scope of the invention.

EXAMPLE I

Function Call With Named Arguments

This Example I illustrates how a software function can be located in an address space defined as the Context. The function can be called with named argument values. What is needed is a function to sum two integers. The function will be implemented as an Endpoint within a first Context, such as Context A. The Endpoint comprises a software function resident in Context A, and will be identified by the Resource Identifier "sum".

The Context is constructed so that it resolves requests for "sum" and returns an IResolution object with a reference to the Endpoint. The Endpoint requires two resources comprising the values to add, for example "value1" and "value2".

Figure 5:
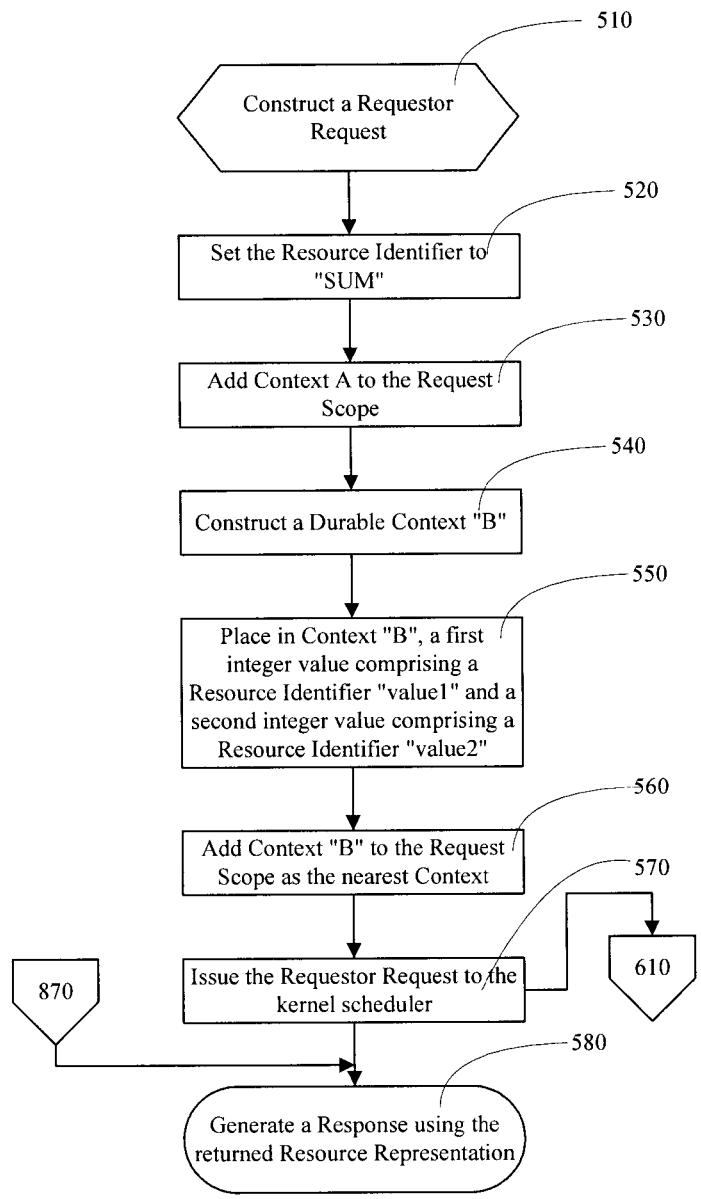
FIG. 5 is a flow chart summarizing the steps of Applicants' method to resolve and evaluate an example request using Applicants' method.

Referring now to FIG. 5, in step 510 a Requestor generates a Requestor Request, using for example the Request format of FIG. 1. In step 520, the Requestor sets the Resource Identifier element of the Request "sum". In step 530, the Requestor adds Context A to the Request Scope of the Request. In step 540, the Requestor constructs a Durable Context B, which comprises a name-value map and provides a single Lookup Endpoint that can source Resource Representations for a Resource Identifier name.

In step 550, the Requestor places integer values with Resource Identifiers "value1" and "value2" into the map of context B. In step 560, the Requestor adds context B as the nearest Context in the Request Scope. In step 570, the Requestor issues the Request to the kernel scheduler. In step 580, the Requestor receives a Response comprising a returned Resource Representation comprising the sum of value1 and value 2. In this example, the returned Resource Representation comprises an Integer object.

Figure 6:
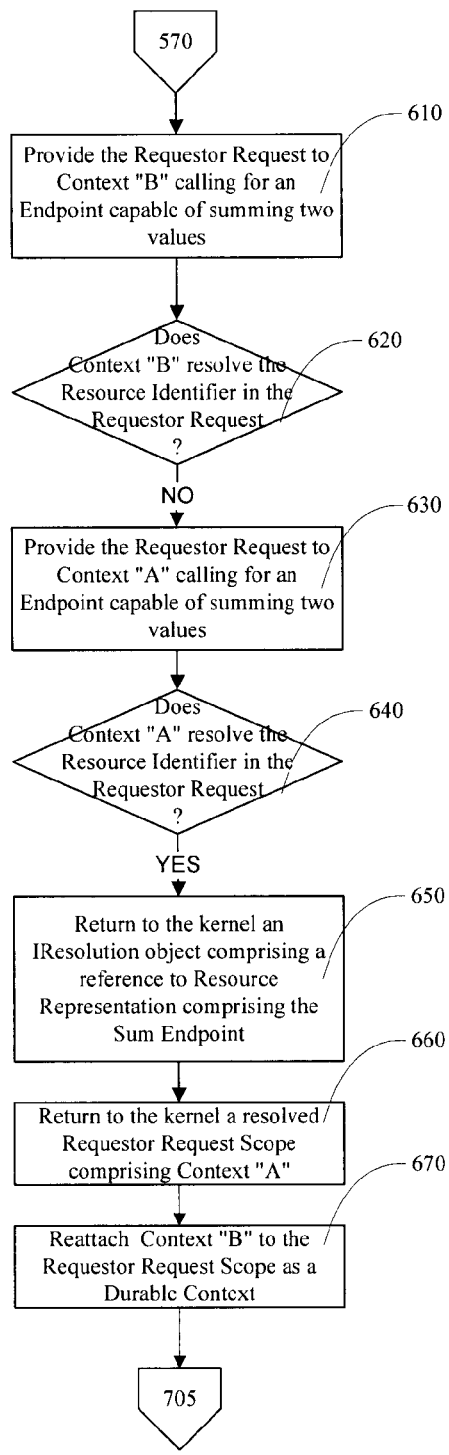
FIG. 6 is a flow chart summarizing certain additional steps of Applicants' method used to resolve and evaluate the example request.

FIG. 6 summarizes the steps of Applicants' method to resolve the Requestor Request. Applicants' method transitions from step 570 to step 610 (FIG. 6). Referring now to FIG. 6, in step 610 the kernel provides the Requestor Request to Context B because Context B is identified as the "nearest Context." In step 620, Applicants' method determines that Context B does not resolve the Resource Identifier in the Requestor Request because Context B does not comprise a summing function.

Applicants' method transitions from step 620 to step 630 wherein the kernel pops the request scope and provides the Requestor Request to Context A. In step 640, Applicants' method determines that Context A resolves the Resource Identifier in the Requestor Request because Context A comprises a function, namely the summing function, that is capable of summing value1 and value2.

In step 650, Context A returns to the Kernel an IResolution object comprising a reference to the Sum Endpoint. In step 660, Context A returns to the kernel a resolved Request Scope comprising Context A only. In the illustrated embodiment of FIG. 6, steps 650 and 660 are shown separately. As a general matter, steps 650 and 660 are combined and/or performed synchronously In step 670, the kernel reattaches Context B to the Resolved Request Scope because Context B is defined as a Durable Context.

Figure 7:
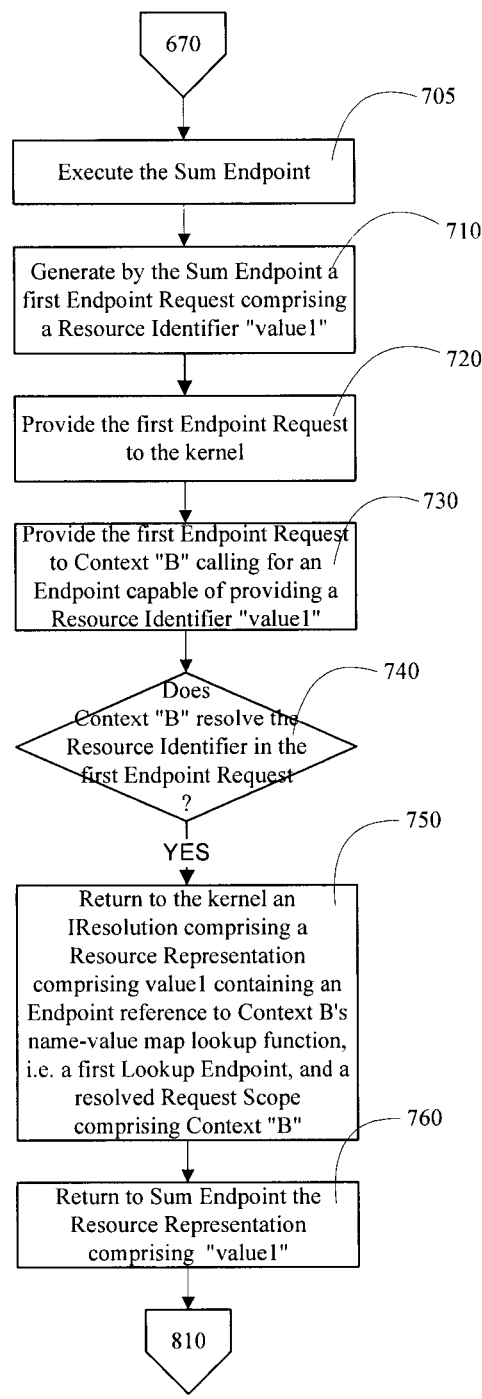
FIG. 7 is a flow chart summarizing certain additional steps of Applicants' method used to resolve and evaluate the example request.
Figure 8:
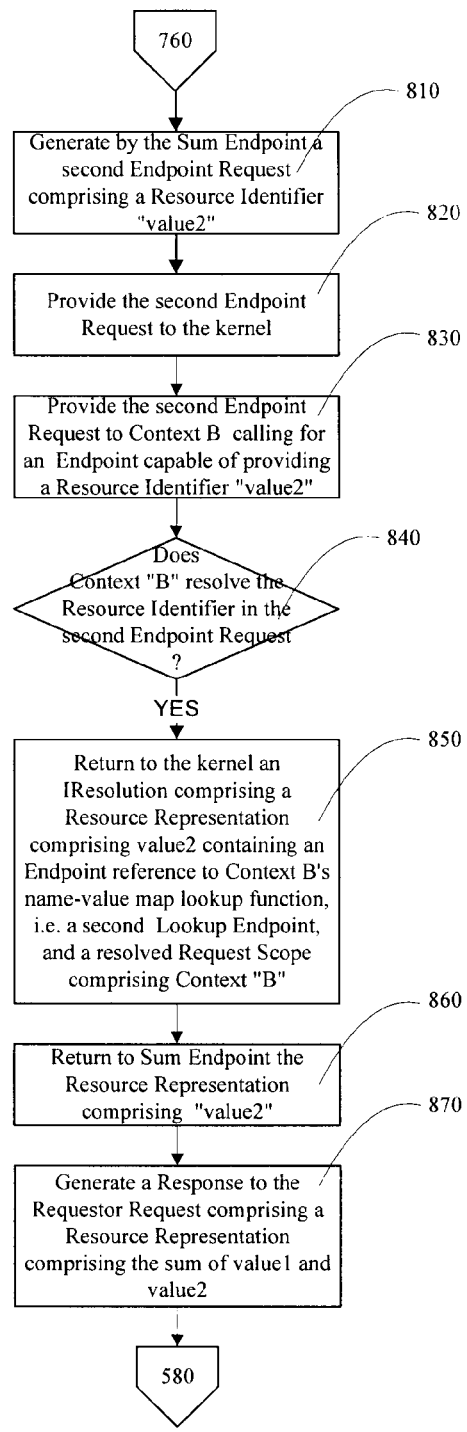
FIG. 8 is a flow chart summarizing certain additional steps of Applicants' method used to resolve and evaluate the example request.

FIGS. 7 and 8 summarize the steps of Applicants' method to evaluate the Requestor Request. Applicants' method transitions from step 670 to step 710 (FIG. 7). Referring now to FIG. 7, in step 705 Applicants' method executes the Sum Endpoint by calling the Sum Endpoint with a New Request consisting values from the Requestor Request and with the Request Scope being the Request Scope resulting from step 670. In step 710, the Sum Endpoint generates a first Endpoint Request for a value comprising the Resource Identifier "value1." In step 720, the Sum Endpoint provides that first Endpoint Request to the kernel. The Endpoint Request has the request scope received from the New Request and as constructed 670 during the Requestor Request resolution. The first Endpoint Request has the New Request as its parent request.

In step 730, the kernel provides the first Endpoint Request to Context B because Context B is denominated the "nearest Context" in the Request Scope for the first Endpoint Request. In step 740, Applicants' method determines that Context B has an endpoint, the Lookup Endpoint, which resolves the Resource Identifier in the first Endpoint Request. In step 750, Context B returns to the kernel an IResolution object containing an Endpoint reference to Context B's name-value map lookup function, i.e. the Lookup Endpoint, and a resolved Request Scope comprising Context B. In step 760, the first Endpoint Request is evaluated in the Lookup Endpoint by constructing a first New Endpoint Request with values of first Endpoint Request and Request Scope obtained in the first Endpoint Request resolution. First New Endpoint Request is evaluated by the Lookup Endpoint to obtain the Resource Representation value for the first Endpoint Request Identifier, and the kernel returns to the Sum Endpoint the Resource Representation comprising a value denominated "value1."

Applicants' method transitions from step 760 to step 810 (FIG. 8) wherein the Sum Endpoint generates a second Endpoint Request for a value comprising the Resource Identifier "value2." In step 820, the Sum Endpoint provides that second Endpoint Request to the kernel. The second Endpoint Request has the Request Scope received from the New Request and as constructed in step 670 during the Requestor Request resolution. The second Endpoint Request has the New Request as its parent request.

In step 830, the kernel provides the second Endpoint Request to Context B because Context B is denominated the "nearest Context" in the Request Scope for the second Endpoint Request. In step 840, Applicants' method determines that Context B has an endpoint, the Lookup Endpoint, which resolves the Resource Identifier in the second Endpoint Request. In step 850, Context B returns to the kernel an IResolution object containing an Endpoint reference to Context B's name-value map lookup function, i.e. the Lookup Endpoint, and a resolved Request Scope comprising Context B. In step 860, the second Endpoint Request is evaluated in the Lookup Endpoint by constructing a second New Endpoint Request with values of second Endpoint Request and Request Scope obtained in the second Endpoint Request resolution. Second New Endpoint Request is evaluated by the Lookup Endpoint to obtain the Resource Representation value for the second Endpoint Request Identifier, and the kernel returns to the Sum Endpoint the Resource Representation comprising a value denominated "value2." In step 870, the Sum Endpoint generates a Response to the Requestor Request comprising the sum of value1 and value2. Applicants' method transitions from step 870 to step 580 wherein the kernel returns to the Requestor a Resource Representation comprising the sum of value1 and value2.

Context B provides a reference to the same Endpoint for both "valueX" requests. One of the valuable properties of Applicants' software system is that object creation is a minimum—usually there is only one instance of a given Endpoint in the system at a time.

Example I, above, assumes that all values are passed as Integer objects. However, the sum function can be made more general and could be written to add floating point values together. In this case, the Sum Endpoint would issue Sum Endpoint Requests for "value1" and "value2" but the Representation Class element 130 (FIG. 1) would require Float representations.

Nevertheless, Context B might still provide Integer resources if value1 and value2 comprise Integer objects. In certain embodiments, Applicants' method comprises a transrepresentor, sometimes referred to as a "transreptor" herein, in context "A," wherein that transreptor supports Integer-To-Float conversions. The kernel would discover "value1" in context B but would recognize that the Integer representation did not match Sum Endpoint's requested Float object model.

The kernel would make a TRANSREPT request from Integer to Float. Context B would fail, but Context A would match and the resolved transrepresentor would be called. The Integer representation would be converted to Float. Ultimately, and transparently, the Sum Endpoint would receive a Float for "value1".

If the Sum Endpoint were to return a Float representation then Applicants' method would add a second transrepresentor in context A that converted Float-To-Integer. The original Requestor could specify in the Requestor Request that it required an Integer representation. The kernel would then transrepresent the Float response returned from "sum" to an Integer value. In various embodiments, Applicants' method implements the Float-To-Integer transrepresentor to be either strict or tolerant. For example, if the Float value were not an integer a strict approach would be to throw an exception indicating that the transrepresentation cannot occur. Alternatively, if the method makes the transrepresentor tolerant, thereby allowing a loss of precision, the method performs a rounding of the float to integer and logs a warning message.

As those skilled in the art will appreciate, Applicants have found it useful to construct a Context implementation wherein URIs identify resources. Requests into the Context use URI Resource Identifiers and, for example, conventional URI schemes, for example 'file:', can be mapped to implementing Endpoints. Furthermore a URI Context implementation has been implemented to resolve Active URIs in which the URI Resource Identifier is itself a functional program. The resolution/evaluation of the active URI to/in Endpoints is the equivalent to 'lazy evaluation' in functional programming.

The Appendices incorporated by reference herein recites source code for an example Context implementation which implements a context address space model that embodies a URI address space of resources. The general Context implementation embodied in Applicants' method significantly extends the capabilities and generality of prior art methods and systems. Applicants' method supports all of the features of the prior art URI-centric hard-coded systems, and offers the opportunity to create Contexts that implement arbitrary address space models. Whilst for existing URI addressing, Applicants' method makes possible functional composition of URI address spaces such that a URI address space in a Context can intercept and provide wrapper functionality (currying) for an imported URI address space. Such interception of Requests introduces the opportunity for capturing a Request and associating with it a transaction, or for applying policy-based access management. In addition the Context implementation embodied in Applicants' method enables transrepresentation to be uniformly treated as resolvable Endpoints that respond to and issue requests, this dramatically simplifies the implementation and state management of the kernel.

Finally, when implementing a URI addressing model a Context may actually describe a bracketed infinity of possible computational results. The reification of a Resource Representation requires the resolution of the URI vector through the composite address space. Because computational results are located at points in an address space a Context can contain all computational results but each value is not reified until you have walked the path (resolved the request) to obtain the answer. As with any other Resource Identifier type, the use of URI addressing for resources, including computational results, means that a Resource Representation can be cached. As a result, after a representation has been computed it does not need to be recomputed unless the resources it depends upon are invalidated.

Applicants' method as described herein provides a method for locating and evaluating software functions within a composable resource address space. In other embodiments, Applicants' method encompasses within the resource context model exotic computational address spaces. In certain embodiments, a quantum context comprises a container for a quantum computation engine able to parallelize the resolution and/or computation of the Resource Representation value within the quantum address space expressed by the Context. This being the case, in these embodiments Applicants' method resolves requests in quantum computation Contexts—such a hybrid classical/quantum processing model to yield very efficient resource resolution and computation married with significant computational efficiency by use of resource caching. Furthermore, in certain of these quantum computational embodiments, the kernel's cache also utilizes a highly efficient quantum search algorithm.

In certain embodiments, Applicants' invention comprises an article of manufacture comprising a computer readable medium having computer readable program code disposed therein to locate, resolve, and invoke software functions where the computer readable program code comprises a series of computer readable program steps, i.e. instructions, to implement Applicants' method described and claimed herein. In other embodiments, Applicants' invention includes instructions residing in a computer program product encoded in a computer readable medium, where those instructions are executed by a computing device to perform Applicants' method described and claimed herein. In either case, the instructions may be encoded in a computer readable medium comprising, for example, a magnetic storage medium, an optical storage medium, an electronic storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to locate, resolve, and invoke software functions, comprising the steps of:
    forming an original request comprising a resource identifier for a logical resource and a first address space, wherein the resource identifier and the first address space are distinct;
    looking up said requested logical resource in a cache prior to resolving said original request;
    if a representation for the requested logical resource cannot be found in said cache, delegating resolution of the request to said first address space;
    resolving by finding in said first address space a physical location of an executable endpoint software function prepared to reify a physical representation of said logical resource;
    constructing a resolved request by combining the physical location of the executable endpoint software function, a resolved logical location of the logical resource at least one address space, and the resource identifier;
    looking up said resolved request in said cache;
    if a representation for the resolved requested cannot be found in said cache, issuing a resolved request to the resolved physical executable endpoint software function to evaluate a reified resource representation.

2. The method of claim 1, further comprising:
    determining whether said resource representation will be reused;
    when said resource representation will be reused, saving said resource representation in a cache.

3. The method of claim 1, wherein:
    said forming step comprises forming an original request comprising an executable action in combination with said resource identifier;
    wherein said endpoint software function comprises executable code capable of executing said executable action on said resource identifier to generate said resource representation further comprising;
    executing said executable action on said resource identifier by said executable endpoint software function.

4. The method of claim 3, wherein said executable endpoint software function performs said forming and delegating steps;
    returning said reified resource representation to said executable endpoint software function.

5. The method of claim 1, wherein said forming step further comprises forming an original request comprising a request scope, wherein said request scope comprises at least one context, wherein each context comprises an address space.

6. The method of claim 5, wherein said original request comprises a first context and a second context, wherein said first context comprises a first address space, and wherein said second context comprises said second address space;
    said resolving step further comprises the steps of:
    determining if said first context resolves said request;
    operative if said first context does not resolve said request:
    removing said first context from said request scope; and
    determining if said second context resolves said request.

7. The method of claim 6, further comprising the steps of:
    operative if said second context resolves the request, returning said request scope as a resolved request scope;
    determining if said first context comprises a durable context;
    operative if said first context comprises a durable context, reattaching said first context to said resolved request scope.

8. The method of claim 7, further comprising the steps of:
    providing a computer program product comprising a kernel;
    providing said original request to said kernel;
    forming by said kernel an executable thread;
    wherein said executable thread:
    returning said request scope as a resolved request scope if said second context resolves the request determines if said first context comprises a durable context;
    operative if said first context comprises a durable context, reattaches said first context to said resolved request scope;
    returns to the kernel a resolution representation comprising the location of said executable endpoint software function, the logical identity of said executable endpoint software function, and said resolved request scope.

9. The method of claim 8, further comprising the step of saving said resolution representation in a cache.

10. The method of claim 8, further comprising the steps of:
    forming a RESOLVE sub-request by said executable thread, wherein said RESOLVE sub-request comprises said original request as a field;
    issuing said RESOLVE sub-request to said first context.

11. The method of claim 10, wherein said first context delegates said RESOLVE sub-request to a third context comprising a third address space.

12. The method of claim 10, wherein said second context delegates said RESOLVE sub-request to a third context comprising a third address space.

13. The method of claim 12, further comprising the steps of:
    appending said third context to said request scope;
    issuing said RESOLVE sub-request with said request scope to said third context;
    returning said resolution representation from said third context to said kernel.

14. The method of claim 8, wherein said evaluating step further comprises the steps of:
    forming a new request;
    providing said new request to said executable endpoint software function.

15. The method of claim 14, wherein said kernel forms said new request, and provides said new request to said executable endpoint software function.

16. The method of claim 14, wherein:
    said forming a new request comprises forming a new request comprising said original request and said resolved request scope;
    said executable endpoint software function uses said new request to generate said reified resource representation.

17. The method of claim 14, further comprising the steps of:
forming a sub-request by said executable endpoint software function;
issuing said sub-request to said kernel;
providing to said executable endpoint software function a sub-request resource representation;
reifying said resource representation by said executable endpoint software function using said sub-request resource representation.

18. The method of claim 3, wherein said executable action is selected from the group consisting of resolve, source, sink, delete, new, exists, meta, and transrept.

19. The method of claim 18, further comprising the steps of:
forming a transrept request, wherein said transrept request comprises:
transrept as the executable action;
said resource representation as a field on request.

20. The method of claim 19, wherein:
said reified resource representation comprises a first representation class;
said transrept request comprises a second representation class, wherein said first representation class differs from said second representation class.

21. An article of manufacture comprising a non-transitory computer readable medium having computer readable program code disposed therein to locate, resolve, and invoke software functions, the computer readable program code comprising a series of computer readable program steps to effect:
receiving an original request comprising a resource identifier for a logical resource and a first address space, wherein the resource identifier and the first address space are distinct;
looking up said requested logical resource in a cache prior to resolving said original request;
if a representation for the requested logical resource cannot be found in said cache, delegating resolution of the request to said first address space;
resolving by finding in said first address space a physical location of an executable endpoint software function prepared to reify a physical representation of said logical resource;
constructing a resolved request by combining the physical location of the executable endpoint software function, a resolved logical location of the logical resource, at least one address space, and the resource identifier;
looking up said resolved request in said cache;
if a representation for the resolved requested cannot be found in said cache, issuing a resolved request to the resolved physical executable endpoint software function to evaluate a reified resource representation.

22. The article of manufacture of claim 21, wherein the computer readable program code further comprises a series of computer readable program steps to effect:
determining whether said resource representation will be reused;
when said resource representation will be reused, saving said resource representation in a cache.

23. The article of manufacture of claim 21, wherein:
the computer readable program code to receive said request further comprises a series of computer readable program steps to effect receiving a first request comprising an executable action in combination with said resource identifier;
wherein said endpoint comprises executable code capable of executing said action on said resource identifier to generate said resource representation;
executing said executable action on said resource identifier by said executable endpoint software function.

24. The article of manufacture of claim 21, said computer readable program code further comprising a series of computer readable program steps to effect:
wherein said executable endpoint software function performs said delegating step;
returning said reified resource representation to said executable endpoint software function.

25. The article of manufacture of claim 21, wherein the computer readable program code to receive said request further comprises a series of computer readable program steps to effect receiving an original request comprising a request scope, wherein said request scope comprises at least one context, wherein each context comprises a address space.

26. The article of manufacture of claim 25, wherein said original request comprises a first context and a second context, wherein said first context comprises a first address space, and wherein said second context comprises a second address space;
the computer readable program code to resolve said request further comprises a series of computer readable program steps to effect:
determining if said first context resolves said request;
operative if said first context does not resolve said request:
removing said first context from said request scope; and
determining if said second context resolves said request.

27. The article of manufacture of claim 26, said computer readable program code further comprising a series of computer readable program steps to effect:
operative if said second context resolves the request, returning said request scope as a resolved request scope;
determining if said first context comprises a durable context;
operative if said first context comprises a durable context, reattaching said first context to said resolved request scope.

28. The article of manufacture of claim 27, wherein said computer program readable code further comprises a kernel, said computer readable program code further comprising a series of computer readable program steps to effect:
providing said original request to said kernel;
forming by said kernel an executable thread;
wherein said executable thread returns said request scope as a resolved request scope if said second context resolves the request;
determines if said first context comprises a durable context;
operative if said first context comprises a durable context, reattaches said first context to said resolved request scope;
returns to the kernel a resolution representation comprising the location of said executable endpoint software function, the logical identity of said executable endpoint software function, and said resolved request scope.

29. The article of manufacture of claim 28, said computer readable program code further comprising a series of computer readable program steps to effect saving said resolution representation in a cache.

30. The article of manufacture of claim 28, said computer readable program code further comprising a series of computer readable program steps to effect:
forming a RESOLVE sub-request by said executable thread, wherein said RESOLVE sub-request comprises said original request as a field;

issuing said RESOLVE sub-request to said first context.

31. The article of manufacture of claim 30, wherein said first context comprises computer readable program code comprising a series of computer readable program steps to effect delegating said RESOLVE sub-request to a third context comprising a third address space.

32. The article of manufacture of claim 30, wherein said second context comprises computer readable program code comprising a series of computer readable program steps to effect delegating said RESOLVE sub-request to a third context comprising a third address space.

33. The article of manufacture of claim 32, said computer readable program code further comprising a series of computer readable program steps to effect:
   appending said third context to said request scope;
   issuing said RESOLVE sub-request with said request scope to said third context;
   returning said resolution representation from said third context to said kernel.

34. The article of manufacture of claim 28, wherein said computer readable program code to evaluate said request further comprises a series of computer readable program steps to effect:
   forming a new request;
   providing said new request to said executable endpoint software function.

35. The article of manufacture of claim 34, wherein said kernel comprises said computer readable program code comprising a series of computer readable program steps to effect forming said new request, and providing said new request to said executable endpoint software function.

36. The article of manufacture of claim 34, wherein:
   said computer readable program code to form a new request further comprises a series of computer readable program steps to effect forming a new request comprising said original request and said resolved request scope;
   said computer readable program code further comprises a series of computer readable program steps to effect generating said reified resource representation using said executable endpoint software function and said new request.

37. The article of manufacture of claim 34, said computer readable program code further comprising a series of computer readable program steps to effect:
   forming a sub-request by said executable endpoint software function; issuing said sub-request to said kernel;
   providing to said executable endpoint software function a sub-request resource representation;
   reifying said resource representation by said executable endpoint software function using said sub-request resource representation.

38. The article of manufacture of claim 23, wherein said executable action is selected from the group consisting of resolve, source, sink, delete, new, exists, meta, and transrept.

39. The article of manufacture of claim 38, said computer readable program code further comprising a series of computer readable program steps to effect:
   forming a transrept request, wherein said transrept request comprises:
   transrept as the executable action;
   said resource representation as a field on request.

40. The article of manufacture of claim 39, wherein:
   said reified resource representation comprises a first representation class;
   said transrept request comprises a second representation class, wherein said first representation class differs from said second representation class.

41. A computer program product embodied on a non-transitory computer readable medium for locating, resolving, and invoking software functions, the computer program product comprising instructions for:
   receiving an original request comprising a resource identifier for a logical resource and a first address space, wherein the resource identifier and the first address space are distinct;
   looking up said requested logical resource in a cache prior to resolving said original request;
   if a representation for the requested logical resource cannot be found in said cache, delegating resolution of the request to said first address space;
   resolving by finding in said first address space a physical location of an executable endpoint software function prepared to reify a physical representation of said logical resource;
   constructing a resolved request by combining the physical location of the executable endpoint software function, a resolved logical location of the logical resource at least one address space, and the resource identifier;
   looking up said resolved request in said cache;
   if a representation for the resolved requested cannot be found in said cache, issuing a resolved request to the resolved physical executable endpoint software function to evaluate a reified resource representation.

42. The computer program product of claim 41, wherein said instructions to save said resource representation further comprise instructions for:
   determining whether said resource representation will be reused;
   when said resource representation will be reused, saving said resource representation in a cache.

43. The computer program product of claim 41, wherein:
   said instructions for receiving an original request further comprise instructions for receiving an original request comprising an executable action in combination with said resource identifier;
   wherein said endpoint comprises executable code capable of executing said action on said resource identifier to generate said resource representation;
   said instructions to evaluate said original request further comprise instructions for executing said executable action on said resource identifier by said executable endpoint software function.

44. The computer program product of claim 43, further comprising instructions for:
   wherein said executable endpoint software function performs said delegating;
   returning said reified resource representation to said executable endpoint software function.

45. The computer program product of claim 41, wherein said instructions for receiving an original request further comprise instructions for receiving an original request comprising a request scope, wherein said request scope comprises at least one context, wherein each context comprises a address space.

46. The computer program product of claim 45, wherein said original request comprises a first context and a second context, wherein said first context comprises a first address space, and wherein said second context comprises a second address space;
   wherein said instructions to resolve said original request further comprise instructions for:
   determining if said first context resolves said request;
   operative if said first context does not resolve said request:
   removing said first context from said request scope; and determining if said second context resolves said request.

47. The computer program product of claim 46, further comprising instructions for:
 operative if said second context resolves the request, returning said request scope as a resolved request scope;
 determining if said first context comprises a durable context;
 operative if said first context comprises a durable context, reattaching said first context to said resolved request scope.

48. The computer program product of claim 47, further comprising a kernel and instructions for:
 providing said original request to said kernel;
 forming by said kernel an executable thread;
 wherein said executable thread:
 returns said request scope as a resolved request scope if said second context resolves the request;
 determines if said first context comprises a durable context;
 operative if said first context comprises a durable context, reattaches said first context to said resolved request scope;
 returns to the kernel a resolution representation comprising the location of said executable endpoint software function, the logical identity of said executable endpoint software function, and said resolved request scope.

49. The computer program product of claim 48, further comprising instructions for saving said resolution representation in a cache.

50. The computer program product of claim 48, further comprising instructions for:
 forming a RESOLVE sub-request by said executable thread, wherein said RESOLVE sub-request comprises said original request as a field;
 issuing said RESOLVE sub-request to said first context.

51. The computer program product of claim 50, wherein said first context comprises instructions to delegate said RESOLVE sub-request to a third context comprising a third address space.

52. The computer program product of claim 50, wherein said second context comprises instructions to delegate said RESOLVE sub-request to a third context comprising a third address space.

53. The computer program product of claim 52, further comprising the instructions for:
 appending said third context to said request scope;
 issuing said RESOLVE sub-request with said request scope to said third context;
 returning said resolution representation from said third context to said kernel.

54. The computer program product of claim 48, wherein said instructions to evaluate the original request further comprise instructions for:
 forming a new request;
 providing said new request to said executable endpoint software function.

55. The computer program product of claim 54, wherein said kernel forms said new request, and provides said new request to said executable endpoint software function.

56. The computer program product of claim 54, wherein:
 said instructions for forming a new request comprise instructions for forming a new request comprising said original request and said resolved request scope;
 said instructions further comprise instructions for generating said reified resource representation using said executable endpoint software function and said new request.

57. The computer program product of claim 54, further comprising instructions for:
 forming a sub-request by said executable endpoint software function;
 issuing said sub-request to said kernel;
 providing to said executable endpoint software function a sub-request resource representation;
 reifying said resource representation by said executable endpoint software function using said sub-request resource representation.

58. The computer program product of claim 53, wherein said executable action is selected from the group consisting of resolve, source, sink, delete, new, exists, meta, and transrept.

59. The computer program product of claim 58, further comprising instructions for: forming a transrept request, wherein said transrept request comprises:
 transrept as the executable action; said resource representation as a field on request.

60. The computer program product of claim 59, wherein:
 said reified resource representation comprises a first representation class;
 said transrept request comprises a second representation class, wherein said first representation class differs from said second representation class.

* * * * *